US011687772B2

(12) United States Patent
Han et al.

(10) Patent No.: US 11,687,772 B2
(45) Date of Patent: Jun. 27, 2023

(54) OPTIMIZATION OF CYBER-PHYSICAL SYSTEMS

(71) Applicant: NEC Laboratories America, Inc., Princeton, NJ (US)

(72) Inventors: Shuchu Han, Princeton Junction, NJ (US); LuAn Tang, Pennington, NJ (US); Haifeng Chen, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 1017 days.

(21) Appl. No.: 16/508,512

(22) Filed: Jul. 11, 2019

(65) Prior Publication Data

US 2020/0019858 A1 Jan. 16, 2020

Related U.S. Application Data

(60) Provisional application No. 62/697,504, filed on Jul. 13, 2018.

(51) Int. Cl.
*G06N 3/08* (2023.01)
*G06N 3/04* (2023.01)

(52) U.S. Cl.
CPC ............... *G06N 3/08* (2013.01); *G06N 3/04* (2013.01)

(58) Field of Classification Search
CPC . G06N 3/08; G06N 3/04; G06N 5/046; G06F 16/24
USPC ........... 706/906, 12, 25, 21, 15, 41; 707/758
See application file for complete search history.

(56) References Cited

U.S. PATENT DOCUMENTS

| 10,161,269 | B2  |   | 12/2018 | Zhang et al. |           |
|------------|-----|---|---------|--------------|-----------|
| 2004/0249775 | A1 | * | 12/2004 | Chen         | G06Q 50/06 |
|            |     |   |         |              | 700/291   |
| 2004/0260489 | A1 | * | 12/2004 | Mansingh     | H02J 3/00 |
|            |     |   |         |              | 702/60    |
| 2009/0113049 | A1 | * | 4/2009  | Nasle        | G06N 3/10 |
|            |     |   |         |              | 709/224   |
| 2022/0188700 | A1 | * | 6/2022  | Khavronin    | G06F 16/35 |

OTHER PUBLICATIONS

Martin Abadi et al., "Tensorflow: a system for large-scale machine learning.", Proceedings of the 12th USENIX Symposium on Operating Systems Design and Implementation (OSDI '16).Nov. 2-4, 2016, Savannah, GA, USA.

Richard J. Campbell, "Increasing the efficiency of existing coal-fired power plants." Congressional Research Service, Dec. 2013.

(Continued)

*Primary Examiner* — Evan Aspinwall
(74) *Attorney, Agent, or Firm* — Joseph Kolodka

(57) ABSTRACT

Methods and systems for optimizing performance of a cyber-physical system include training a machine learning model, according to sensor data from the cyber-physical system, to generate one or more parameters for controllable sensors in the cyber-physical system that optimize a performance indicator. New sensor data is collected from the cyber-physical system. One or more parameters for the controllable sensors are generated using the trained machine learning module and the new sensor data. The one or more parameters are applied to the controllable sensors to optimize the performance of the cyber-physical system.

19 Claims, 7 Drawing Sheets

(56) References Cited

OTHER PUBLICATIONS

Tianqi Chen et al., "Mxnet: A flexible and efficient machine learning library for heterogeneous distributed systems." arXiv preprint arXiv:1512.01274, Dec. 2015.
Jyrki Kivinen et al., "Online learning with kernels", IEEE Transactions on Signal Processing, vol. 52, No. 8, pp. 2165-2176, Aug. 2004.
Frank Seide et al., "CNTK: Microsoft's open-source deep-learning toolkit." Proceedings of the 22nd ACM SIGKDD International Conference on Knowledge Discovery and Data Mining. ACM, Aug. 2016.
Friedhelm Schwenker et al., "Three learning phases for radial-basis-function networks." Neural networks 14.4-5, May 2001.
Steven Van Vaerenbergh et al., "Online regression with kernels." Number Machine Learning & Pattern Recognition Series. Chapman and Hall/CRC, Mar. 2014.

\* cited by examiner

OPTIMIZATION OF CYBER-PHYSICAL SYSTEMS

RELATED APPLICATION INFORMATION

This application claims priority to U.S. Provisional Application No. 62/697,504, filed on Jul. 13, 2018, incorporated herein by reference herein its entirety.

BACKGROUND

Technical Field

The present invention relates to optimization of key performance indicators for a cyber-physical system and, more particularly, to continuous, local optimization of sensor settings within a cyber-physical system.

Description of the Related Art

Cyber-physical systems, such as power stations, include a number of mechanical, physical, or otherwise tangible systems that operate to generate some useful output. These cyber-physical systems are monitored by a variety of sensors that track physical conditions of the system. The gathered information can be used to optimize the cyber-physical system's output.

SUMMARY

A method for optimizing performance of a cyber-physical system includes training a machine learning model, according to sensor data from the cyber-physical system, to generate one or more parameters for controllable sensors in the cyber-physical system that optimize a performance indicator. New sensor data is collected from the cyber-physical system. One or more parameters for the controllable sensors are generated using the trained machine learning module and the new sensor data. The one or more parameters are applied to the controllable sensors to optimize the performance of the cyber-physical system.

A method for optimizing performance of a cyber-physical system includes training an artificial neural network, according to sensor data from the cyber-physical system, to generate one or more parameters for controllable sensors in the cyber-physical system that optimize a performance indicator. The artificial neural network includes a hidden layer that has radial basis function neurons that accept sensor data inputs from a plurality of sensors and that further has a constant value neuron. New sensor data is collected from the cyber-physical system. One or more parameters for the controllable sensors are generated using the trained artificial neural network and the new sensor data. The one or more parameters are applied to the controllable sensors to optimize the performance of the cyber-physical system.

A system for optimizing performance of a cyber-physical system includes a model trainer configured to train a machine learning model, according to sensor data from the cyber-physical system, to generate one or more parameters for controllable sensors in the cyber-physical system that optimize a performance indicator. An optimizer is configured to generate one or more parameters for the controllable sensors using the trained machine learning model and new sensor data. A sensor interface is configured to collect the new sensor data from the cyber-physical system and to apply the one or more parameters to the controllable sensors to optimize the performance of the cyber-physical system.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present invention, systems and methods are provided monitor and optimize the performance of a cyber-physical system. The present embodiments make use of a continuously trained neural network model, based on a radial basis function, to generate parameters that optimize the cyber-physical system in view of the latest collected data. The present embodiments furthermore recognize a distinction between controllable sensors, where the measured value can be directly controlled by one or more parameters within the cyber-physical system, and non-controllable sensors. This makes it possible to optimize parameters for the controllable sensors, while still monitoring the values measured by the non-controllable sensors.

Figure 1:
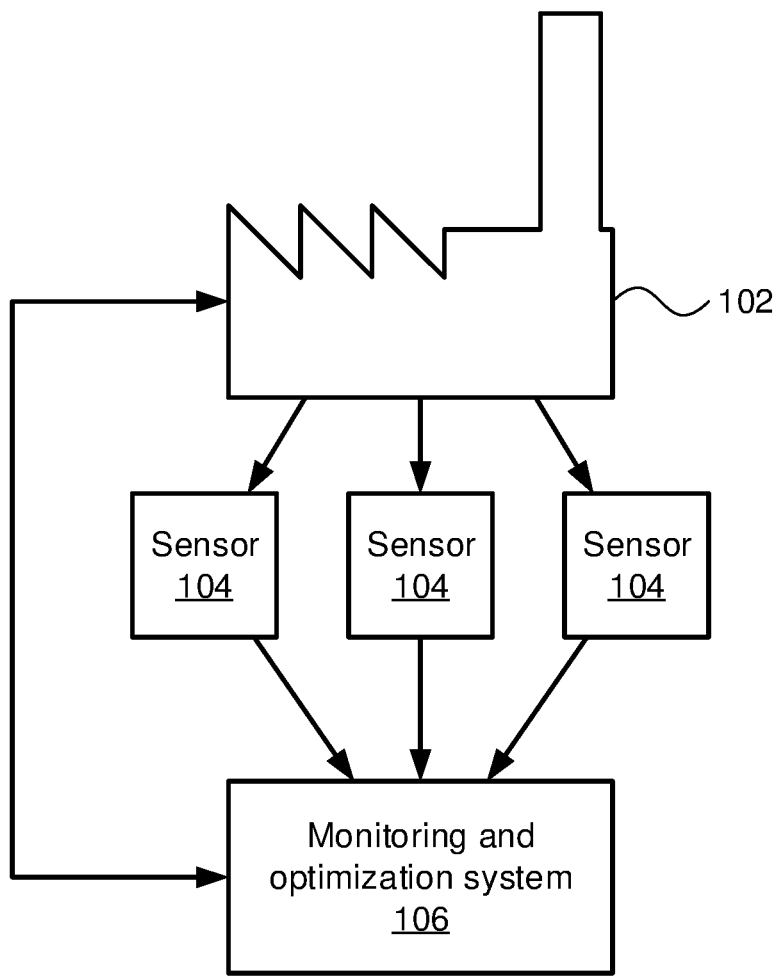
FIG. 1 is a block diagram of a cyber-physical system that has a performance that is monitored and optimized by a set of sensors, including controllable and non-controllable sensors, in accordance with an embodiment of the present invention.

Referring now in detail to the figures in which like numerals represent the same or similar elements and initially to FIG. 1, a cyber-physical system 102 is illustratively depicted in accordance with one embodiment of the present invention. The system 102 is monitored by a set of sensors 104, which can each be either controllable or non-controllable. The sensors 104 record information about the cyber-physical system 102 and pass that information to a monitoring and optimization system 106. The monitoring and optimization system 106 trains a machine learning model using collected data and optimizes parameters of the cyber-physical system 102 to optimize one or more performance indicators.

The cyber-physical system 102 can be any appropriate system that integrates a physical or mechanical process with distributed monitoring. It is particularly contemplated that the cyber-physical system 102 can be implemented as a power plant, but it should be understood that the present principles apply to any such system.

The physical status of the cyber-physical system 102 changes over time. Effects that causes changes to this status include environmental differences, including weather differences and seasonal differences, electricity loads, and the aging, deterioration, and breakdown of physical components. Thus, even if the performance of the cyber-physical system was optimized at one point with a particular set of parameters, those parameters will not produce optimal outputs forever.

The sensors 104 can monitor any physical or electronic process or system within the cyber-physical system. Exemplary sensors 104 include environmental sensors that measure ambient or environmental information, such as temperature sensors, humidity sensors, and air pressure sensors; operational sensors that measure characteristics of the physical process, such as accelerometers, counters, and scales; and electronic sensors that measure characteristics of electronic or software processes, such as logs kept by software programs within the cyber-physical system 102. It should be understood that any given sensor block 104 can include multiple individual sensors, and that sensors 104 can be integrated with different physical machines or systems within the cyber-physical system 102. Any number of sensors 104 can be employed, and it is particularly contemplated that many such sensors 104 can all be used to provide real-time information about many different aspects of the cyber-physical system 102.

The sensors 104 are identified as being either controllable or non-controllable. A controllable sensor is one that measures a property of the cyber-physical system 102 that can be controlled by some parameter of the cyber-physical system 102. For example, a sensor that measures the temperature of ambient air can be a controllable sensor in an embodiment where a heating/cooling system is present, because control of the heating/cooling system is available to control the temperature. In another example, however, a sensor that measures the temperature of ambient air would not be a controllable sensor if it were exposed to the outside air, because there would be no process by which the cyber-physical system 102 could control that property.

In some embodiments, the sensors 104 can be arranged as "Internet of Things" devices, with each having respective communications capabilities that interface with a communications network within the cyber-physical system 102. For example, each sensor 104 can communicate with a wireless access point to send its information to the monitoring and optimization system 106. In an alternative embodiment, the sensors 104 can communicate with the monitoring and optimization system 106 via a mesh network. It should be understood that any form of wired or wireless communications can be used instead of these specific examples.

The monitoring and optimization system 106 will be described in greater detail below. The system 106 has the ability to issue commands to one or more parts of the cyber-physical system 102 to change the parameters of its operation, responsive to changes in the condition of the cyber-physical system 102 and based on performance indicators reported by the cyber-physical system 102, to maintain optimal performance. In some embodiments, the monitoring and optimization system 106 optimizes according to one or more performance indicators, either to maximize or minimize those indicators. Following the example of a power plant, the indicator may be a heat rate, which measures the efficiency of the power plant, lower heat rates indicating a higher efficiency. The monitoring and optimization system 106 learns a model of the relationships between measured values from the sensors 104 and the resulting effects on the performance indicator(s) and uses the learned model to set parameters for the controllable sensors 104.

Figure 2:
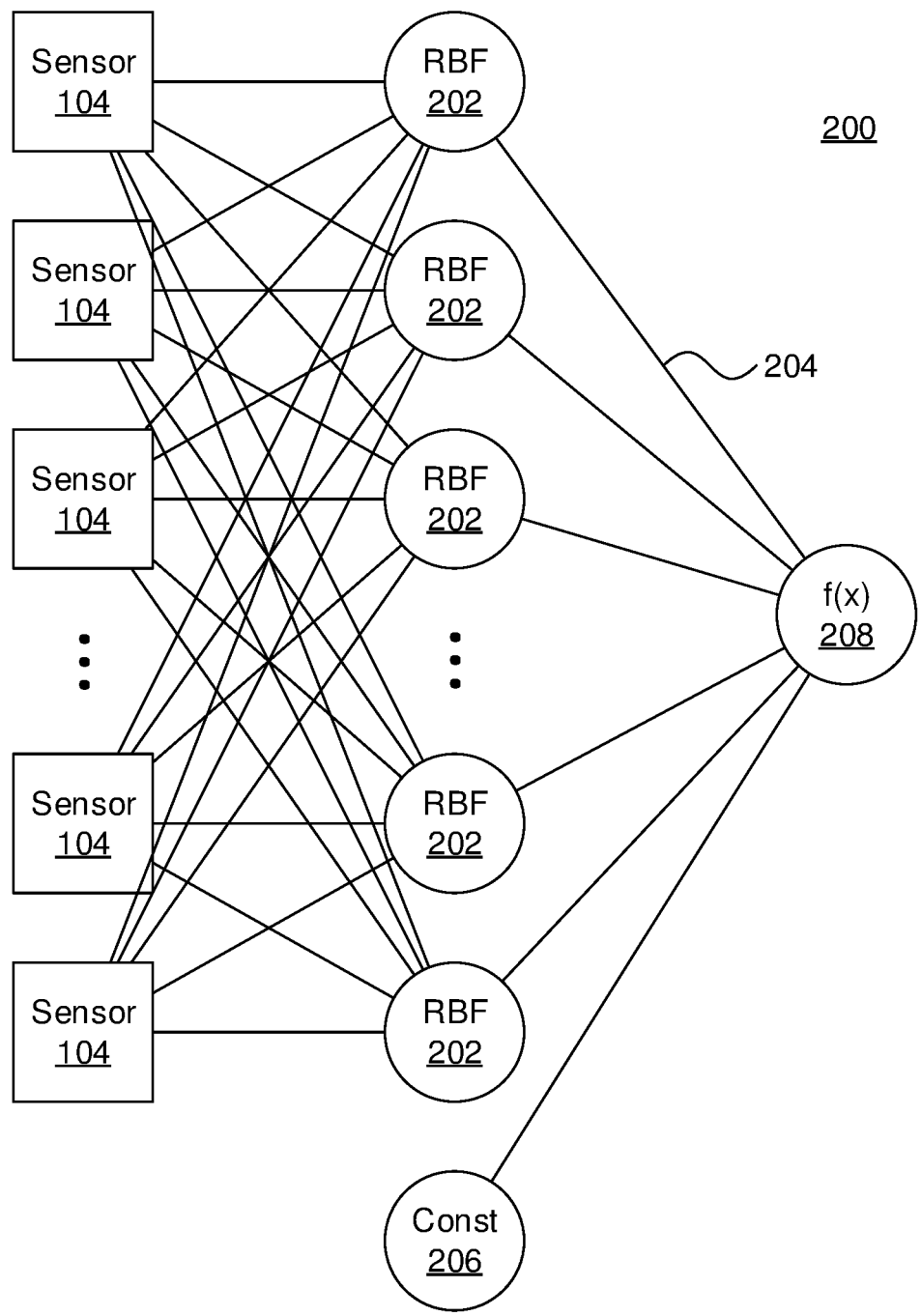
FIG. 2 is a diagram of a neural network that takes inputs from the monitoring sensors of a cyber-physical system and uses a hidden layer that includes radial basis function neurons to optimize the performance of the cyber-physical system in accordance with an embodiment of the present invention.

Referring now to FIG. 2, an illustration of a machine learning model for the monitoring and optimization system 106 is shown. An exemplary artificial neural network (ANN) 200 is shown. An ANN is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

ANNs demonstrate an ability to derive meaning from complicated or imprecise data and can be used to extract patterns and detect trends that are too complex to be detected by humans or other computer-based systems. The structure of a neural network is known generally to have input neurons (in this case, shown as the sensors 104) that provide information to one or more "hidden" neurons (in this case, a set of radial basis function (RBF) blocks 202). Connections 204 between the neurons are weighted. The weighted inputs from the sensors 104 are then processed by the RBF blocks 202 according to a function that will be described in greater detail below, with weighted connections 204 between the layers. Although it is specifically contemplated that only one RBF layer need be used in this embodiment, it should be understood that additional layers, performing different functions, can also be used. The hidden layer also includes a constant neuron 206 that provides a constant output value. Finally, an output neuron 208 (in this case, a combination of the weighted outputs of the hidden layer according to a function $f(x)$) accepts and processes weighted input from the last set of hidden neurons.

This represents a "feed-forward" computation, where information propagates from input neurons to the output neuron. Upon completion of a feed-forward computation, the output is compared to a desired output available from training data. The error relative to the training data is then processed in "feed-back" computation, where the hidden neurons and input neurons receive information regarding the error propagating backward from the output neurons. Once the backward error propagation has been completed, weight updates are performed, with the weighted connections 204 being updated to account for the received error. This represents just one variety of ANN.

During feed-forward operation, the sensors 104 each provide an input signal in parallel to a respective row of weights 204. The weights 204 each have a respective settable value, such that a weight output passes from the weight 204 to a respective RBF block 202 to represent the weighted input to the RBF block 202. In software embodiments, the weights 204 may simply be represented as coefficient values that are multiplied against the relevant signals.

Figure 3:
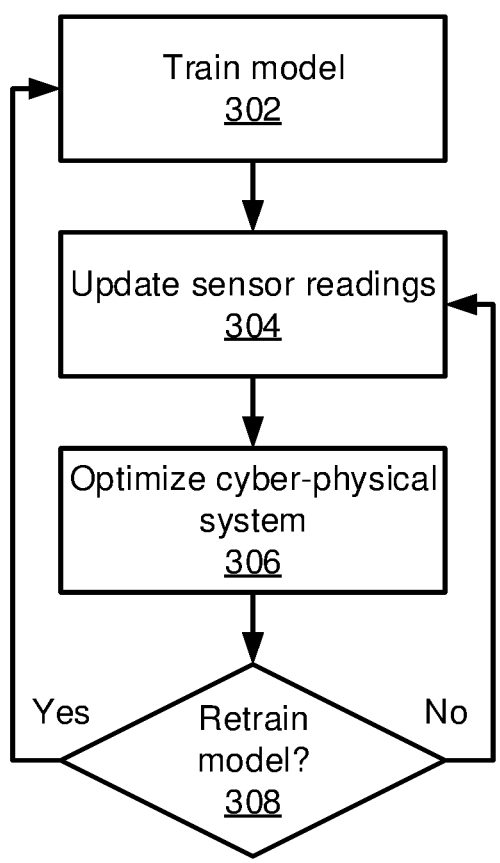
FIG. 3 is a block/flow diagram of a method for training and updating a machine learning model that accepts sensor readings from a cyber-physical system and outputs parameters for optimizing the performance of the cyber-physical system in accordance with an embodiment of the present invention.

Referring now to FIG. 3, a high-level view of a method for optimizing the cyber-physical system 102 is shown. Block 302 trains a machine learning model, for example an ANN 200 as described above. This training process is initially based on a set of training data, for example a set of historical sensor readings and associated performance indicators.

Block 304 collects updated sensor readings from the sensors 104 to determine the present state of the cyber-physical system 102. Block 306 uses the up-to-date sensor readings as an input to the trained model to identify parameters that will optimize the cyber-physical system 102. Block 306 sets the identified parameters in the cyber-physical system 102 accordingly.

Block 308 determines whether to retrain the model. It should be understood that this determination may alternatively be performed in parallel with the optimization of block 306 or may be on a separate cycle. As will be described in greater detail below, block 308 determines whether a predicted set of performance indicators matches a measured set of performance indicators. If the difference is greater than a threshold value, processing returns to block 302 to retrain the model with the latest sensor readings. If not, processing returns to block 304 to update the sensor readings and perform a new optimization.

Figure 4:
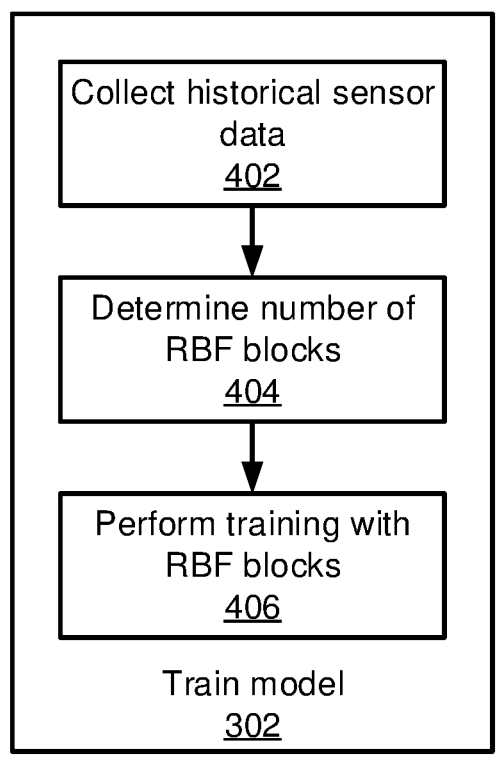
FIG. 4 is a block/flow diagram that gives a detailed method for training the machine learning model based on historical sensor data and a number of radial basis function neurons to use in accordance with an embodiment of the present invention.

Referring now to FIG. 4, additional detail is shown on the training of the model in block 302. Block 402 collects historical sensor data that has been collected by the sensors 104. It should be noted that "historical sensor data" need not include only the data that existed at the time block 302 is first executed, but may also include sensor data that was collected since that time. All sensor data can be stored in a database at the monitoring and optimization system 106 or, in some embodiments, only a subset of the sensor data may be stored. Block 404 determines the number of RBF blocks 202 to use in the model and block 406 trains the model with the determined number of RBF blocks 202 using the historical sensor data. The number of RBF blocks 202 can be set as half the number of input sensors as a default. For example, if there are three thousand sensors 104, including controllable and non-controllable sensors, the default number of RBF blocks 202 can be set to 1500 as a default.

Learning the model in block 406 uses the parameter m, which dictates how many RBF blocks 202 are in the model. Historical data is used to train the model using, for example, the following objective function:

$$\min_{\alpha} \sum_{i=1}^{m} \|f(x) - \alpha_i k(c_i, x) - b\|_2^2 + \beta \|\alpha\|_2^2$$

where x represents a vector of sensor data from the sensors 104, $f(x) = \sum_{i=1}^{m} \alpha_i k(c_i, x) + b$, $\alpha$ is a vector of weight coefficients between the RBF blocks 202 and the output neuron 208, b is a weight coefficient between the constant neuron 206 and the output neuron 208, $\beta$ is a bias of the model $f(x_{new})$ that is learned by the neural network, $k(c_i, x)$ is the function $e^{\lambda_i \|c_i - x\|_2^2}$, $\lambda_i$ is the control bandwidth of a Gaussian kernel and is a parameter that is learned by the neural network, and $c_i$ is a support vector that is learned by the neural network and that has the same dimension as x.

Once model training is complete, the learned model can be used to predict the performance indicators, using new sensor reading values as input. This is expressed as:

$$f(x_{new}) = \sum_{i=1}^{m} \alpha_i k(c_i, x_{new}) + b$$

where $x_{new}$ is a vector of the new sensor values.

Figure 5:
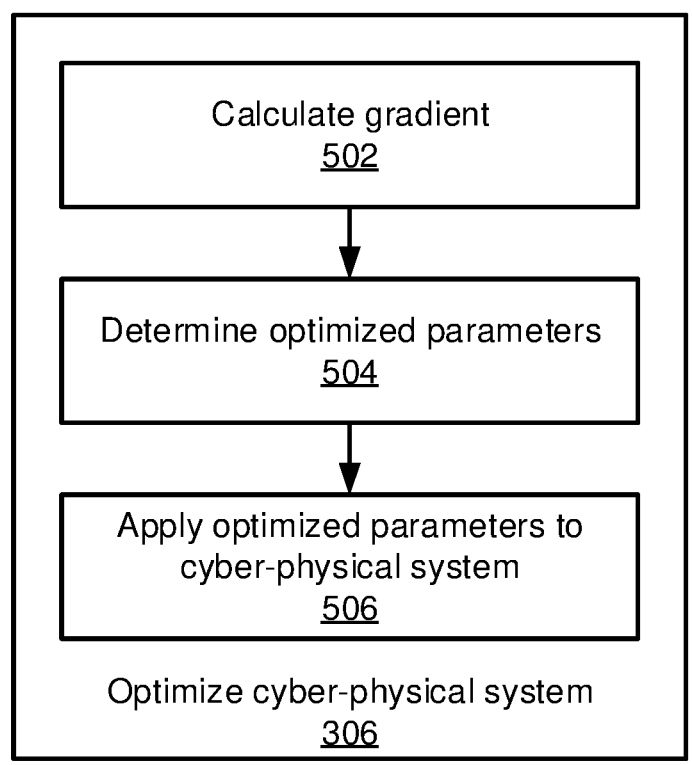
FIG. 5 is a block/flow diagram that gives a detailed method for optimizing performance of the cyber-physical system using the trained machine learning model in accordance with an embodiment of the present invention.

Referring now to FIG. 5, additional detail on the optimization of the cyber-physical system 102 is shown. Block 502 calculates the gradient of the function $f(x)$, using the most recent sensor data, as:

$$\frac{\partial f}{\partial x} = 2 \sum_{i=1}^{m} e^{\lambda_i \|c_i - x\|_2^2} \sum_{i=1}^{m} \lambda_i (x - c_i)$$

Block 504 determines the optimized parameters, which relate to controllable sensors. The performance indicators can be either maximized or minimized, depending on how they relate to the performance of the cyber-physical system 102. Following the example of using heat rate for a power station, a smaller heat rate indicates superior power station efficiency, so the optimization will reduce the performance indicator in this example to a degree that is controlled by a hyper-parameter η. This is expressed as:

$$x_{controllable} = x_{controllable} + \eta \frac{\partial f}{\partial x_{controllable}}$$

where $x_{controllable}$ represents the subset of the sensors x that are controllable. Block 506 then applies the determined optimized parameters to the controllable sensors in the cyber-physical system 102.

Figure 6:
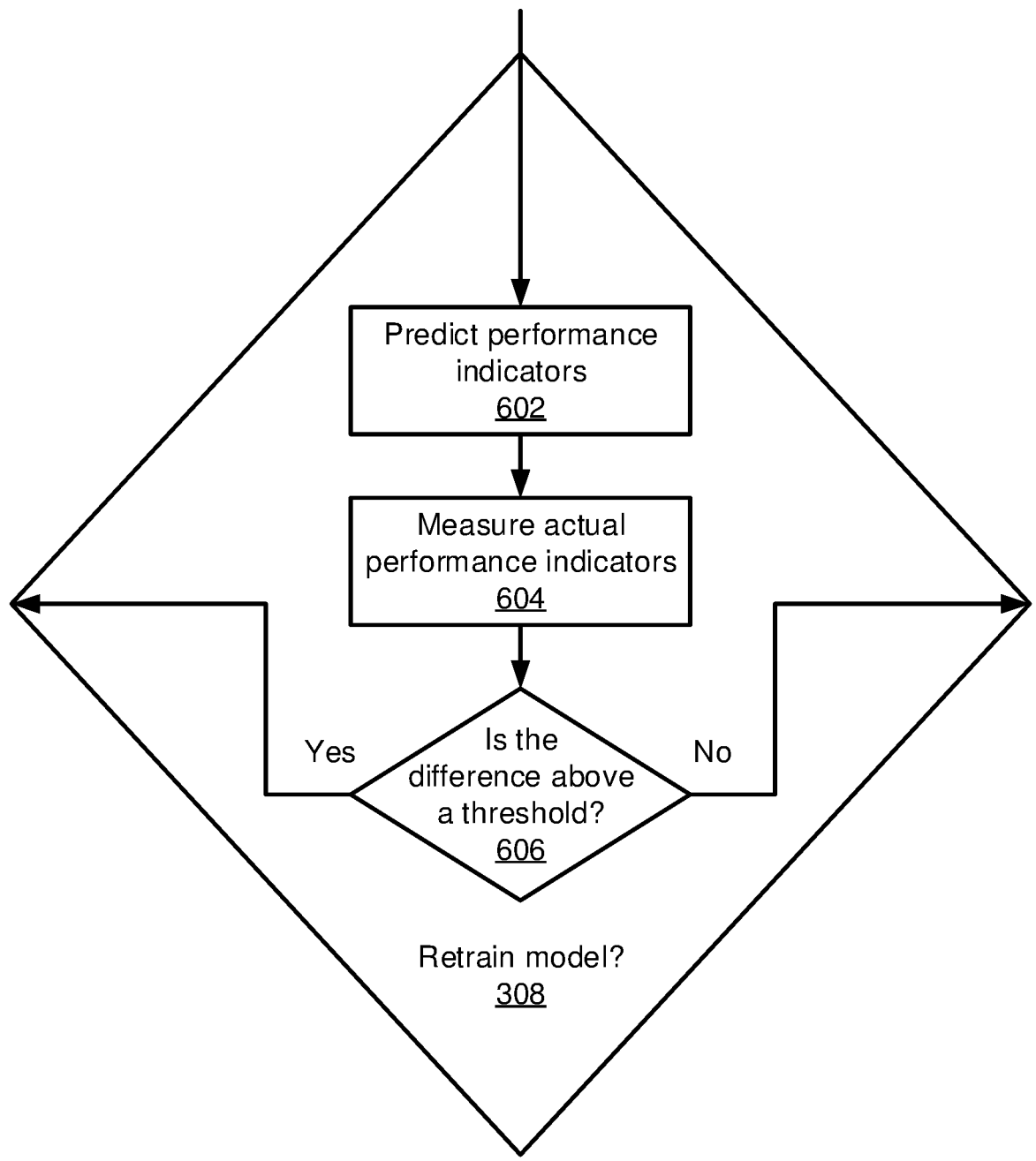
FIG. 6 is a block/flow diagram that gives a detailed method for determining whether to retain the machine learning model based on a difference between actual performance indicators and predicted performance indicators in accordance with an embodiment of the present invention.

Referring now to FIG. 6, additional detail is shown regarding the determination of whether to retrain the model in block 308. Block 602 uses the model's current parameters to determine an expected performance indicator or indicators. Block 604 determines the actual performance indicators, as reported by the cyber-physical system 102. Block 606 determines whether a difference between the actual performance indicators and the predicted performance indicators exceeds a threshold. If so, this indicates that the state of the cyber-physical system 102 has changed and that the model needs to be retrained.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 7:
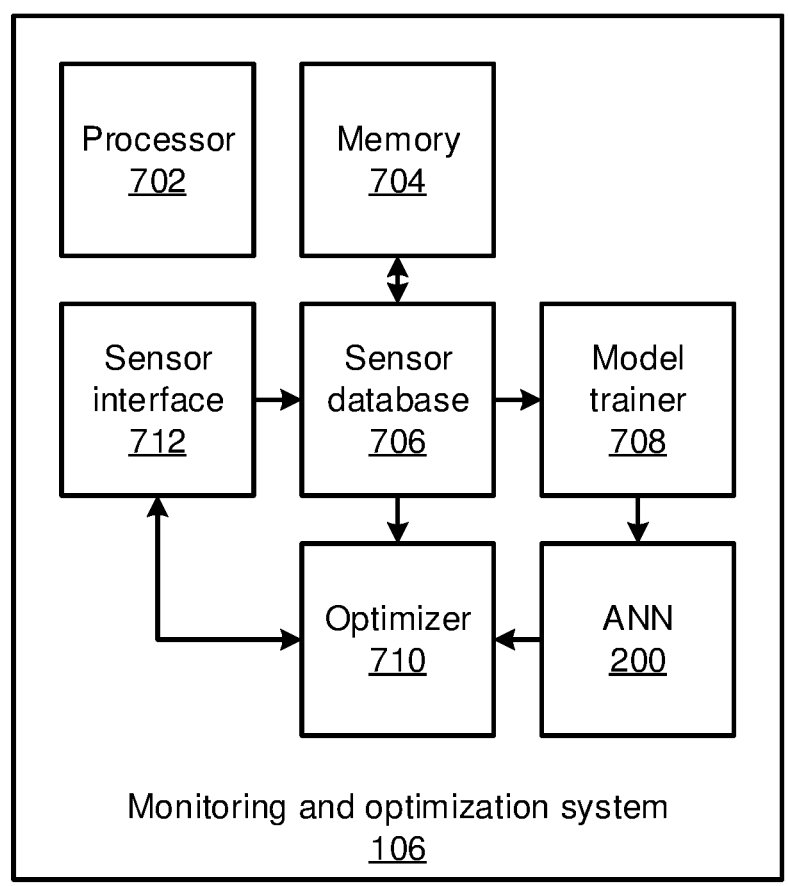
FIG. 7 is a block diagram of a system for training and updating a machine learning model that accepts sensor readings from a cyber-physical system and outputs parameters for optimizing the performance of the cyber-physical system in accordance with an embodiment of the present invention.

Referring now to FIG. 7, additional detail on the system 106 for monitoring and optimizing a cyber-physical system 102 is shown. The system 106 includes a hardware processor 702 and a memory 704 and may optionally include one or more functional modules. In some embodiments, the functional modules can be implemented as software that is stored in the memory 704 and that is executed by the processor 702. In other embodiments, one or more functional modules can be implemented as one or more discrete hardware components in the form of, e.g., application-specific integrated chips or field programmable gate arrays.

A sensor interface 712 collects information from the sensors 104 via any appropriate wired or wireless communications medium and protocol. Sensor information is stored in memory 704 in a sensor database 706. The stored sensor information is used by model trainer 708 to train a machine learning model, such as ANN 200 and, when predicted performance indicators deviate from actual performance indicators, to retrain the machine learning model using up-to-date sensor data. An optimizer 710 uses the sensor data and the trained model 200 to determine a set of parameters for controllable sensors and applies the determined parameters to the controllable sensors via sensor interface 712.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for optimizing performance of a cyber-physical system, comprising:
    training a machine learning model, according to sensor data from the cyber-physical system, to generate one or more parameters for controllable sensors in the cyber-physical system that optimize a performance indicator;
    collecting new sensor data from the controllable sensors the cyber-physical system, wherein the controllable sensors measure controllable properties of the cyber-physical system;
    generating one or more parameters for the controllable sensors using the trained machine learning model and the new sensor data; and
    applying the one or more parameters to the controllable sensors to change the controllable properties of the cyber-physical system to optimize the performance of the cyber-physical system.

2. The method of claim 1, further comprising retraining the machine learning module based on the new sensor data.

3. The method of claim 2, wherein retraining the machine learning module comprises:
    determining a predicted performance indicator using the generated one or more parameters; and
    determining an actual performance indicator from the cyber-physical system.

4. The method of claim 3, wherein retraining the machine learning module further comprises determining that a difference between the predicted performance indicator and the actual performance indicator exceeds a threshold, and wherein retraining the machine learning module is performed responsive to determining that the difference exceeds the threshold.

5. The method of claim 1, wherein the machine learning model is an artificial neural network with a hidden layer t includes a plurality of radial basis function neurons.

6. The method of claim 5, wherein the hidden layer also includes a constant value neuron.

7. The method of claim 5, wherein the neurons of the hidden layer receive sensor data inputs from each of a plurality of sensors.

8. The method of claim 5, wherein outputs of the hidden layer are compiled by a single neuron in an output layer.

9. The method of claim 1, wherein generating the one or more parameters and applying the one or more parameters to the controllable sensors is performed every time new sensor data is collected from the cyber-physical system.

10. A method for optimizing performance of a cyber-physical system, comprising:
    training an artificial neural network, according to sensor data from the cyber-physical system, to generate one or more parameters for controllable sensors in the cyber-physical system that optimize a performance indicator, wherein the artificial neural network includes a hidden layer that has a plurality of radial basis function neurons that accept sensor data inputs from a plurality of sensors and that further has a constant value neuron;

collecting new sensor data from the controllable sensors of the cyber-physical system, wherein the controllable sensors measure controllable properties of the cyber-physical system;

generating one or more parameters for the controllable sensors using the trained artificial neural network and the new sensor data; and applying the one or more parameters to the controllable sensors to change the controllable properties of the cyber-physical system to optimize the performance of the cyber-physical system.

11. A system for optimizing performance of a cyber-physical system, comprising:

model trainer configured to train a machine learning model, according to sensor data from the cyber-physical system, to generate one or more parameters for controllable sensors in the cyber-physical system that optimize a performance indicator;

an optimizer configured to generate one or more parameters for the controllable sensors using the trained machine learning model and new sensor data, wherein the controllable sensors measure controllable properties of the cyber-physical system; and a sensor interface configured to collect the new sensor data from the controllable sensors of the cyber-physical system and to apply the one or more parameters to the controllable sensors to change the controllable properties of the cyber-physical system to optimize the performance of the cyber-physical system.

12. The system of claim 11, wherein the model trainer is further configured to retraining the machine learning module based on the new sensor data.

13. The system of claim 12, wherein the model trainer is further configured to determine a predicted performance indicator using the generated one or more parameters and to determine an actual performance indicator from the cyber-physical system.

14. The system of claim 13, wherein the model trainer is further configured to determine that a difference between the predicted performance indicator d the actual performance indicator exceeds a threshold and to perform retraining responsive to the determination that the difference exceeds the threshold.

15. The system of claim 11, wherein the machine learning model is an artificial neural network with a hidden layer that includes a plurality of radial basis function neurons.

16. The system of claim 15, wherein the hidden layer also includes a constant value neuron.

17. The system of claim 15, wherein the neurons of the hidden layer receive sensor data inputs from each of a plurality of sensors.

18. The system of claim 15, wherein outputs of the hidden layer are compiled by a single neuron in an output layer.

19. The system of claim 11, wherein the model trainer is further configured to generate the one or more parameters, and wherein the sensor interface is further configured to apply the one or more parameters to the controllable sensors, every time new sensor data is collected from the cyber-physical system.

* * * * *